United States Patent [19]
Bourkel et al.

[11] Patent Number: 5,447,174
[45] Date of Patent: Sep. 5, 1995

[54] PILOT STAGE FOR PRESSURE CONTROL VALVES

[75] Inventors: Arsène Bourkel, Belvaux, Luxembourg; Bernd Lanfermann, Rees, Germany; Karl Tratberger, Duisburg, Germany; Karl-Heinz Post, Kaarst, Germany

[73] Assignee: Hydrolux S.a.r.l., Luxembourg, Luxembourg

[21] Appl. No.: 281,644

[22] Filed: Jul. 28, 1994

[30] Foreign Application Priority Data

Aug. 2, 1993 [LU] Luxembourg ............ 88390

[51] Int. Cl.⁶ ............ G05D 16/10; F16K 17/10
[52] U.S. Cl. ............ 137/115; 137/489; 137/495
[58] Field of Search ............ 137/115, 116, 489, 491, 137/495

[56] References Cited

U.S. PATENT DOCUMENTS

| 2,498,542 | 2/1950 | Gardiner . | |
|---|---|---|---|
| 3,180,355 | 4/1965 | Long | 137/495 X |
| 3,884,262 | 5/1975 | Assembergs | 137/115 X |
| 3,972,345 | 8/1976 | Court . | |
| 4,275,758 | 6/1981 | Masuda | 137/489 |
| 4,351,356 | 9/1982 | Koiwai et al. . | |

FOREIGN PATENT DOCUMENTS

| 2649178 | 1/1991 | France . |
|---|---|---|
| 3045360 | 7/1982 | Germany . |
| 2101157 | 1/1983 | United Kingdom . |

*Primary Examiner*—Robert G. Nilson
*Attorney, Agent, or Firm*—Howrey & Simon; C. Scott Talbot

[57] ABSTRACT

A pilot stage for pressure control valves includes an axially displaceable valve piston which bounds a valve chamber axially on one side and includes a valve seat for a closure cone therein. Valve piston has an actuating surface in a pressure chamber that is substantially larger than the free cross section of the valve seat. By pressurization of this pressure chamber, a large hydrostatic force is exerted on the valve piston which opposes the closing force of the pressure-setting spring. A housing stop fixes a first axial end position of the valve piston in the direction of this hydrostatic force. The pilot control stage has improved properties for both manually adjustable pressure control valves and proportional pressure control valves.

9 Claims, 7 Drawing Sheets

PILOT STAGE FOR PRESSURE CONTROL VALVES

BACKGROUND OF THE INVENTION

The invention relates to a pilot stage for pressure control valves. More particularly, it relates to a pilot stage or valve for pressure control valves having a valve chamber connected to a first control channel, a closure element axially displaceable in the valve chamber and engaging therein a valve seat, and a pressure-setting spring associated with the closure element so as to exert a closing force on the closing element in the direction of the valve seat.

The function of pressure control valves in hydraulic systems is to limit the system pressure to a specific pre-set pressure level. If this pre-set value is achieved, then the pressure control valve responds and returns the surplus volume flow (i.e. the difference between the pump flow rate and the load flow rate) to the tank. In the case of a relatively large flow rate, the pressure control valves are provided with pilot stages.

Pilot stages for pressure control valves may include manual adjusting means for the pressure-setting spring. If such pilot stages are combined with a controllable directional valve, the operation of the assembly may be changed from a pressure control mode to a pressureless circulation mode. This change from one mode to another is effected by bypassing the pilot stage via the directional valve. Undesirable pressure peaks in the hydraulic system are caused when the main stage response is too rapid to this change in operation from one mode to another.

Pilot stages for pressure control valves may also include proportional actuating coils for adjusting the pressure. Because of the limited actuation force of an actuating coil, the free cross section of the valve seat (or area of the closing element exposed to the pressure in the valve seat channel) must be smaller in proportional pilot stages, than in manually adjustable pilot stages. An undesirable pressure increase is caused in the hydraulic system with an increasing flow rate through the main stage when a valve seat is used which has a relatively small cross section.

Proportional pressure control valves often include an additional spring-loaded, manually-adjustable, pressure release valve. The object of an additional pressure release valve is to safeguard the hydraulic system from excessive pressures caused by high control currents at the proportional actuating coil. This additional pressure release valve entails increased expense and requires additional space.

The disadvantages and problems of the prior art, pilot-controlled, pressure control valves will be discussed below and are illustrated in FIGS. 1 and 2. In both figures, a pressure control valve 10 is shown. This valve 10 comprises a main piston 12, a main valve seat 13, a main piston spring 14 and a main control chamber 16. The object of the pressure control valve 10 is to protect a hydraulic system 18 against inadmissible high pressures and/or to maintain an adjusted pre-set pressure setting. To that end, the hydraulic system 18 is connected through the pressure control valve 10 to a pressureless tank 22 by means of a relief channel 20.

The reference number 24 indicates a pilot valve with manual pressure adjustment. The valve has a valve seat 26 and a closure cone 28. The latter is axially displaceable in a valve chamber 30 and may sealingly engage the valve seat 26. A manually adjustable pressure-setting spring 32 is associated with the closure cone 28 so that it exerts thereon a closing force in the direction of the valve seat 26. The valve chamber 30 is connected to the tank 22 by way of a first control channel 34. A second control channel 36 opens into the valve seat 26. The other end of the second control channel 36 is hydraulically connected by way of a third control channel 38 to the main control chamber 16 and by way of a fourth control channel 40 to the hydraulic system 18.

If the system pressure $P_E$ in the hydraulic system 18 is lower than the opening pressure set at the pressure-setting spring 32, then the pilot valve 24 is closed and the main control chamber 16 is pressurized with the system pressure $P_E$. Since the main piston 12 has in the main control chamber 16 a main control surface or pilot area 42 which corresponds approximately to the free cross section of its valve seat 13, the main piston 12 is then in hydrostatic equilibrium and is pressed by way of the main piston spring 14 into its valve seat 13 to form a seal. Consequently the connection between the hydraulic system 18 and the tank 22 through the relief channel 20 is closed.

If the system pressure $P_E$ in the hydraulic system 18 exceeds the opening pressure set at the pressure-setting spring 32, the closure cone 28 opens against the pressure-setting spring 32 and enables pilot oil to be discharged through the valve chamber 30 and the first control channel 34 to the tank 22. Admission of pilot oil through the fourth control channel 40 from the hydraulic system 18 is limited by a first throttle 44. A relatively constant control pressure is established in the second control channel 36 and the main control chamber 16. If the system pressure $P_E$ continues to rise, then ultimately the main piston 12 opens and the hydraulic system 18 is connected through the relief channel 20 to the tank 22, and as a result the system pressure is limited.

In FIG. 1 the hydraulic system 18 may be depressurized using an electromagnetically operated directional valve 46 (e.g. a 2/2-way valve with spring return) which is responsive to a control signal. This directional valve 46 is connected hydraulically in parallel with the pilot valve 24 and thereby bypasses the pilot valve 24. When the directional valve 46 is opened electromagnetically, the main control chamber 16 is relieved to tank 22. In other words, by bypassing the pilot valve 24, the pressure adjustment function becomes ineffective. The main control piston 12 opens, because its main control surface 42 is now relieved of pressure, and the flow in the hydraulic system 18 is deviated to the relief channel 20. The system pressure that establishes in the hydraulic system 18 is dependent on the counter-force of the main piston spring 14 and the throttles 44, 48, 50 arranged in the pilot system.

The prior art depressurization of the hydraulic system 18 of FIG. 1 provides an unsatisfactory result. The main piston 12 responds too abruptly to the bypassing of the pilot valve 24 and opens within a few milliseconds, so that a relief shock occurs, corresponding to the rapid flow rate increase in relief channel 20. In addition to causing noise, such relief shocks may lead to disturbances in the system, such as damage to filters, coolers, seals, and supporting elements, for example, or to undesirable vibrations in the machines connected to the system. Throttle 48 (inserted in the outlet of the main control chamber 16) and throttle 50 (inserted in the tank channel of the pilot valve 24) provide an inadequate slowing down of the opening movement of the main piston 12. The effectiveness of the throttles 48, 50 are limited because they must have a minimum free cross section so that dirt particles are prevented from blocking them.

The prior art pressure control valve 10 in FIG. 2 is used as a pilot-controlled, proportional, pressure control valve having an independent mechanical pressure relief. The reference number 52 indicates a pilot valve which, like the pilot valve 24, comprises a valve seat 54 and a closure cone 56. This closure cone 56 is axially displaceable in a valve chamber 58 and sealingly engages in the valve seat 54. In place of the manually adjustable pressure-setting spring 32 in the pilot valve 24, the pilot valve 52 has an electrically-controllable, proportional, actuating coil 60 generating the closing force of the closure cone 56 in proportion to an electric control current 62. Since the closure force acting on the closure cone 56 determines the opening pressure of the pilot valve 52 and consequently the pressure in the main control chamber 16 of the pressure control valve 10, the pressure $P_E$ in the hydraulic system 18 is continuously varied in proportion to the electrical control current 62. In an alternative embodiment, the proportional actuating coil 60 acts on a pressure spring (not shown) which exerts a closing force on the closure cone 56 in the direction of the valve seat 54 and continuously controls the bias thereof, and thus the pressure $P_E$ in the hydraulic system 18.

Both embodiments have the disadvantage that the free cross section of the valve seat 54 has to be designed relatively small because of the limited actuating force (generally about 60N to 100N) of the proportional actuating coil 60. Therefore the free cross section of the valve seat 54 is normally about seven to ten times smaller than the free cross section of the valve seat 26 in the manually adjustable pilot valve 24. This considerably reduced flow cross section of the valve seat 54 leads to parasitic pressure losses in the pilot valve 52, which is undesirable since main control chamber 16 is now far more dependent on fluctuations in the flow in control channel 40. Fluctuations in the flow in the control channel 40 may be caused by the following. A flow increase through pressure control valve 10 results in higher flow forces acting on the main piston 12 in the closing direction, This causes the pressure $P_E$ in the hydraulic system to increase, which in turn causes an increased flow rate in control channel 40. The effect is a rise of the system pressure $P_E$ with an increasing flow rate Q through the pressure control valve 10. The larger the pressure loss in pilot control valve 52, the steeper the rise in the characteristic curve (Q; $P_E$) of the pilot-controlled pressure control valve 10. While actuating coils provide benefits over manually adjustable valves, the problems (discussed above) caused by the smaller free cross sectional area point out the need for an improve pilot stage for a pressure control valve.

In FIG. 2 a manually adjustable pilot valve 24' is arranged in parallel with the pilot valve 52. The object of pilot valve 24' is to protect the hydraulic system 18 against excessive pressures. For example, high pressures may be caused by a defective control of proportional actuating coil 60 (e.g. excessive control current 62). This pilot valve 24' corresponds in function and construction with the pilot valve 24 of FIG. 1 and has a valve seat 26', a closure cone 28', a valve chamber 30' and a pressure-setting spring 32'. Incorporating a second valve 24' into the pilot part of the pressure control valve 10 entails increased expense and requires additional space.

The foregoing demonstrates that there is a need for a pilot stage for a pressure control valve that protects the hydraulic system from the relief shocks and pressure losses associated with the prior art pilot stages.

SUMMARY OF THE INVENTION

The invention satisfies this need and avoids the drawbacks of the prior art by providing a pilot stage for a pressure control valve that controls the opening of the main stage such that pressure losses and relief shocks are averted. With this pressure control valve, a slow response of the main stage to the control signal for pressure relief is guaranteed, so that no disturbing pressure shocks occur as the hydraulic system is relieved of pressure. This invention provides a pilot stage which has improved properties both for manually-adjustable and proportional pilot-controlled, pressure control valves.

In a pilot stage according to the invention, the free cross section of the valve seat may be the same size as in manually adjustable pilot stages. Specifically, the marked difference in size between the actuating surface of the valve piston in the pressure chamber and the free cross section of the valve seat results in following advantages:

(a) a low pressure in the pressure chamber produces a significant force for increasing the pre-loading of the pressure-setting spring, and
(b) a high control pressure in the connection channel to the valve seat produces a low pressure increase in the pressure chamber for emptying the latter through the third control channel, and therefore results in a highly effective damping of the valve piston. Consequently, the free cross section of the valve seat may be sized larger without functional disadvantages both in manually-adjustable, pilot-controlled pressure control valves and in pilot-controlled, proportional, pressure control valves.

Because of the relatively large free cross section of the valve seat in the pilot stage according to the invention, the control pressure established in the connection channel to the valve seat is relatively independent from the flow rate through this pilot stage. Similarly the pressure in the hydraulic system has greater independence from the flow through the main stage.

A discharge throttle may be inserted in the control tank channel to further control the time response of the main stage to the control signal for pressure relief. The pressure-relief phase in the hydraulic system may be adjusted without having to choose a throttle with an unreasonably small free cross section according to the pilot stage of the invention. Additionally, an inlet throttle may be inserted in the control pressure channel. By means of this inlet throttle, the pressure build-up phase in the hydraulic system may be adjusted independently of the pressure relief phase.

The present invention also provides a pilot-controlled, manually adjustable pressure control valve that may be switched to pressure-relief, e.g. by means of a control signal, without causing pressure peaks in the hydraulic system. The present invention additionally provides a pilot-controlled, proportional pressure control valve that has an excellent valve behavior and an integrated mechanical safeguard against maximum pressure being exceeded. The present invention further provides a pilot-controlled proportional pressure control valve equipped with a displacement sensor for sensing the position of the valve piston to achieve a very accurate pressure adjustment. The position of the valve piston may be proportionally adjusted to a pre-set value signal in a closed loop, position-control circuit. Consequently, the pre-loading of the pressure-setting spring is controlled with very high accuracy.

DETAILED DESCRIPTION

Figure 1:
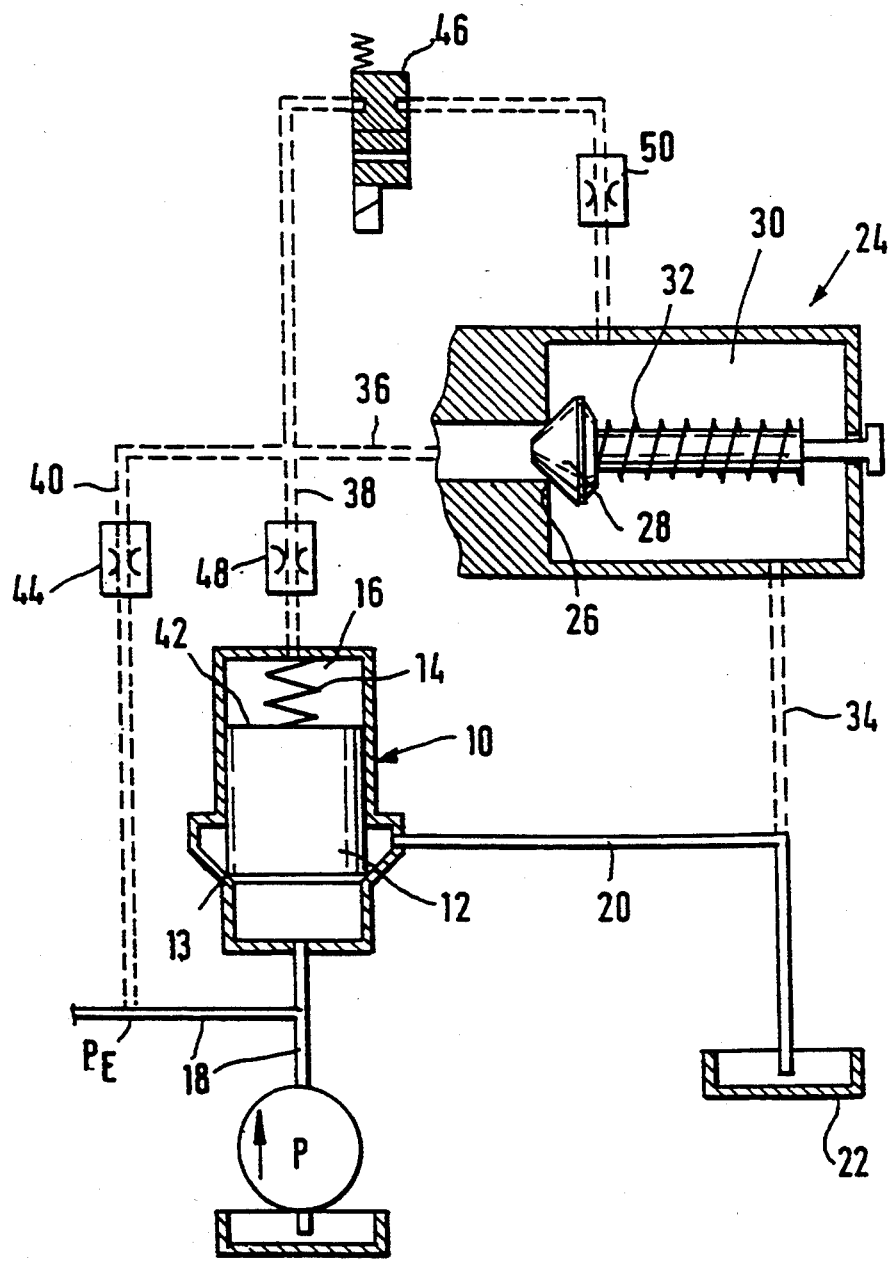
FIG. 1 is a hydraulic layout of a prior art, pilot-controlled, pressure control valve having a manual adjustment means for setting the opening pressure and a device responsive to a control signal to change from a pressure control mode to a pressureless circulation mode.

One embodiment of a pilot valve for a pilot stage according to the invention is described with reference to FIGS. 3 and 4. The valve 1 00 includes the following main elements: a valve housing 102, a closure element, a pressure-setting spring 106, an adjusting means 108 for the pressure-setting spring 106, a valve piston 110, and a valve sleeve 112 for the valve piston 110.

In one embodiment of the invention the valve piston has a first and second cross sectional region which are both axially sealed in a guide bore for the valve piston 110. These cross sectional regions delimit within the guide bore an inner annular chamber into which the connection channel 142 to the valve seat opens. This inner annular chamber is connected to the second control channel 156.

The closure element is preferably a closure cone 104 rigidly connected to a damping piston 134, which is guided axially in a guide bore 138 of the valve piston 110. Thus a perfect axial guidance of the closure cone 104 is guaranteed, and an additional damping of the opening and closing movements of the closure cone 104 is achieved.

The valve sleeve 112 is inserted in a sealed manner in a first stepped bore 116 of the valve housing 102. A closure stopper 114 seals this first stepped bore 116 axially and at the same time fixes the valve sleeve 112 therein. A second stepped bore 118 extends the stepped bore 116 axially through the valve housing 102 and has a smaller cross section than the first stepped bore 116. This second stepped bore 118 is sealed axially by the adjusting means 108, such as a conventional, manually-operated, adjusting mechanism with a screw spindle. The pressure-setting spring 106 bears at a first end against a spring plate 120 of adjusting means 108 and at its second end against a shoulder surface 122 of closure cone 104, and accordingly exerts a resilient force on the closure cone 104 in the direction of the first stepped bore 116. This force is manually adjustable through adjusting means 108.

Figure 4:
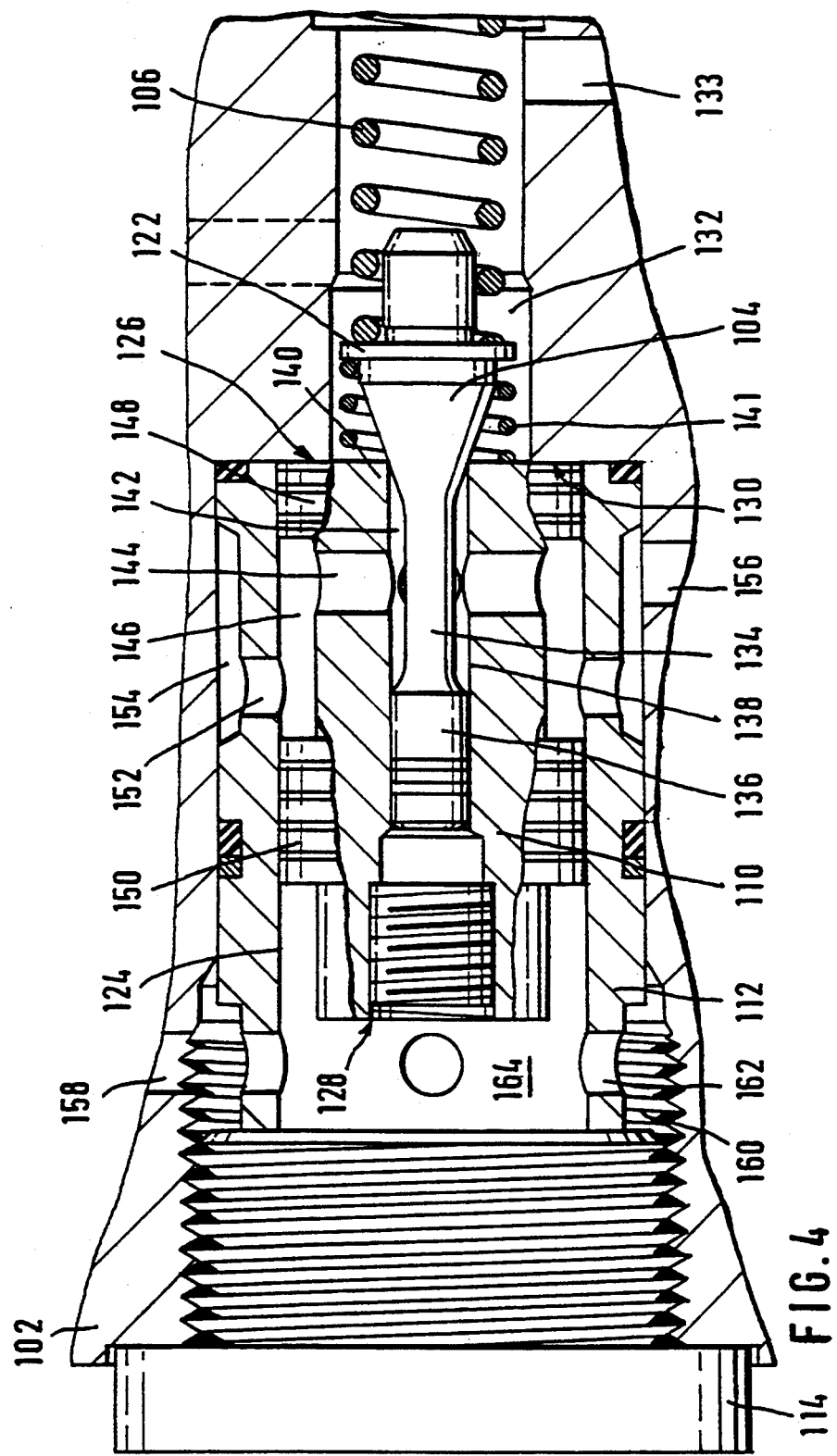
FIG. 4 is an enlarged view of FIG. 3.

FIG. 4 illustrates an enlarged view of the inner left-hand part of the pilot valve 100, particularly the valve sleeve 112, the valve piston 110 and the closure cone 104. The valve piston 110 is axially displaceable within a guide bore 124 of the valve sleeve 112, between a first axial end position (in which the piston lies with its first end surface 126 against an annular shoulder surface 130 in the valve housing 102 forming a housing stop) and a second axial end position (in which it lies with its second end surface 128 against the closure stopper 114). A valve chamber 132 in axial continuation of the guide bore 124 has a smaller cross section than the latter, thus forming shoulder surface 130. In FIG. 4, the valve piston is located in its first axial end position. A first control channel 133 opens into the valve chamber 132.

in the pilot valve the pre-loading of the pressure-setting spring 106 may be continuously varied between a minimum value and a maximum value by adjusting the pressure in the pressure chamber 164. The maximum pre-loading of the pressure-setting spring 132 is obtained when the valve piston 110 is in its first axial end position against the annular shoulder surface 130. Even when the pressure in the pressure chamber is excessively high, this maximum pressure-setting cannot be exceeded.

The closure cone 104 is rigidly connected to a damping piston 134. This piston 134 is guided axially by a guide extension 136 at its free end in a guide bore 138 in the valve piston 110. This damping piston 134 may have a flattened surface on the guide extension 136 to displace the hydraulic fluid, so that a damping force opposing the respective direction of movement of the closure cone 104 is created. The first end of the guide bore 138 (or rather its axial continuation) opens axially at one end into the first end surface 126 of the valve piston 110 and forms therein the free cross section of a valve seat 140 in which the closure cone 104 engages positively. Of course, the closure element may be a spherical or plate-shaped valve with a suitably adapted valve seat rather than the conical configuration shown. An opening spring 141 is provided between closure cone 104 and the first end surface 126 of the valve piston 110.

At its opposite end, the guide bore 138 is sealed axially. A connection channel 142 of annular cross section leading to the valve seat 140 is defined between the damping piston 134 and the guide bore 138, since the damping piston 134 has, between its guide extension 136 and the closure cone 104, a substantially smaller cross section than the guide bore 138. A transverse bore 144 in the valve piston 110 connects the connection channel 142 with an inner annular chamber 146. The latter is bounded axially in a sealed manner within the guide bore 124 between a first and second cross sectional region 148, 150 of the valve piston 110. The inner annular chamber 146 is connected through an outer annular chamber 154 to a second control channel 156, through the corresponding connecting openings 152 in the valve sleeve 112. The outer annular chamber 154 is arranged between the valve sleeve 112 and the first stepped bore 116.

A third control channel 158 is connected by way of a further outer annular chamber 160 and a further connecting opening 162 in the valve sleeve 112 to a pressure chamber 164. This pressure chamber 164 is bounded within the guide bore 124 of the valve sleeve 112 by closure stopper 114 and the second end surface 128 of the valve piston 110. The valve piston thus has in this pressure chamber 164 a pressure-actuating surface, the area of which corresponds to the cross section of the guide bore 124. This area is more than ten times larger than the free cross section of the valve seat 140.

Of course, the above-described embodiment may be structurally altered without departing from the basic concept of the invention. For example, the damping piston 134 may be omitted and the closure cone 104 guided by structure external to the valve piston 110. The valve sleeve 112 could also be omitted. Similarly other known devices may be substituted for the two end stops associated with valve piston 110.

Figure 3:
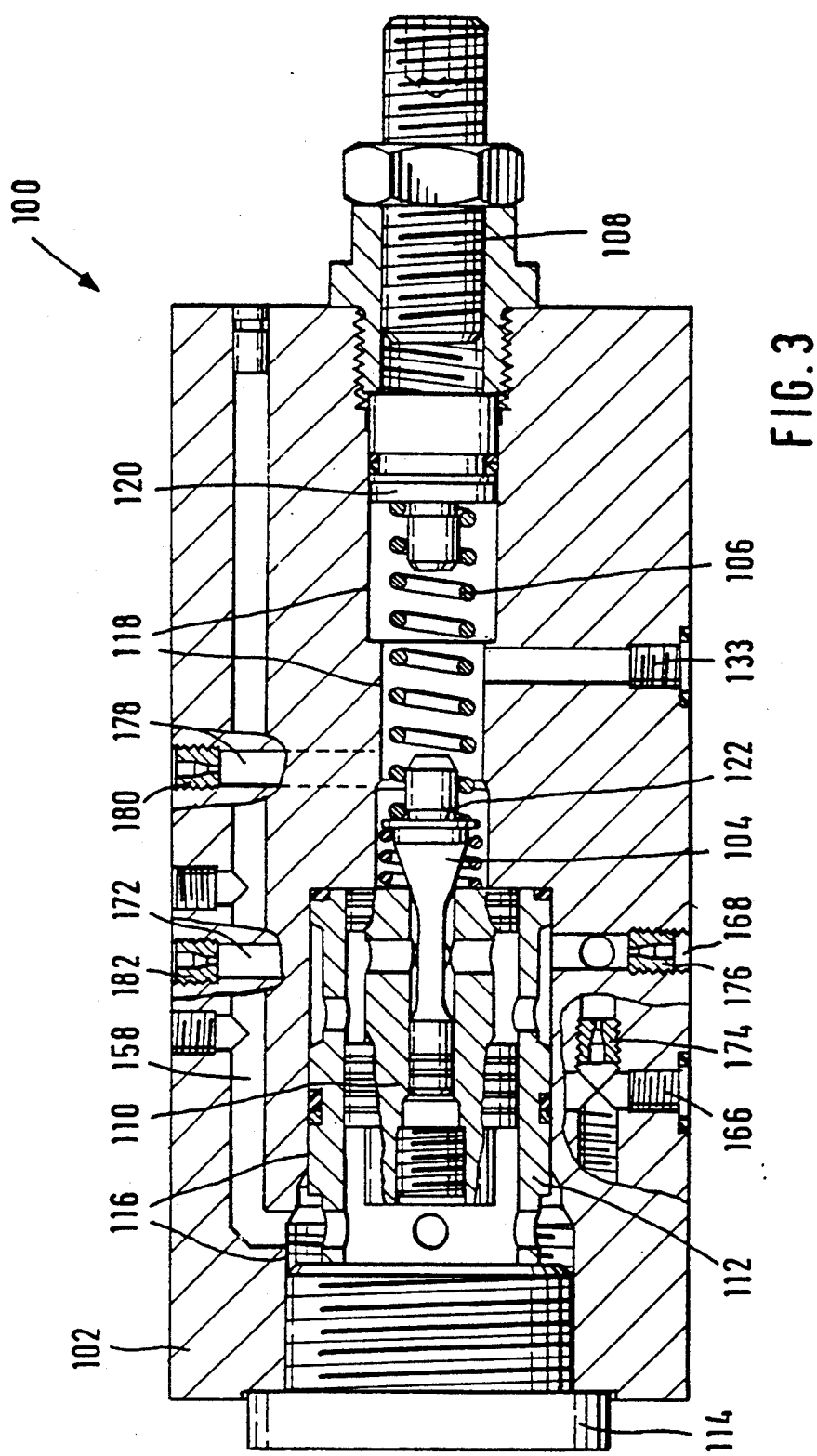
FIG. 3 is a cross sectional elevational view of the pilot valve constructed according to the principles of the invention.
Figure 5:
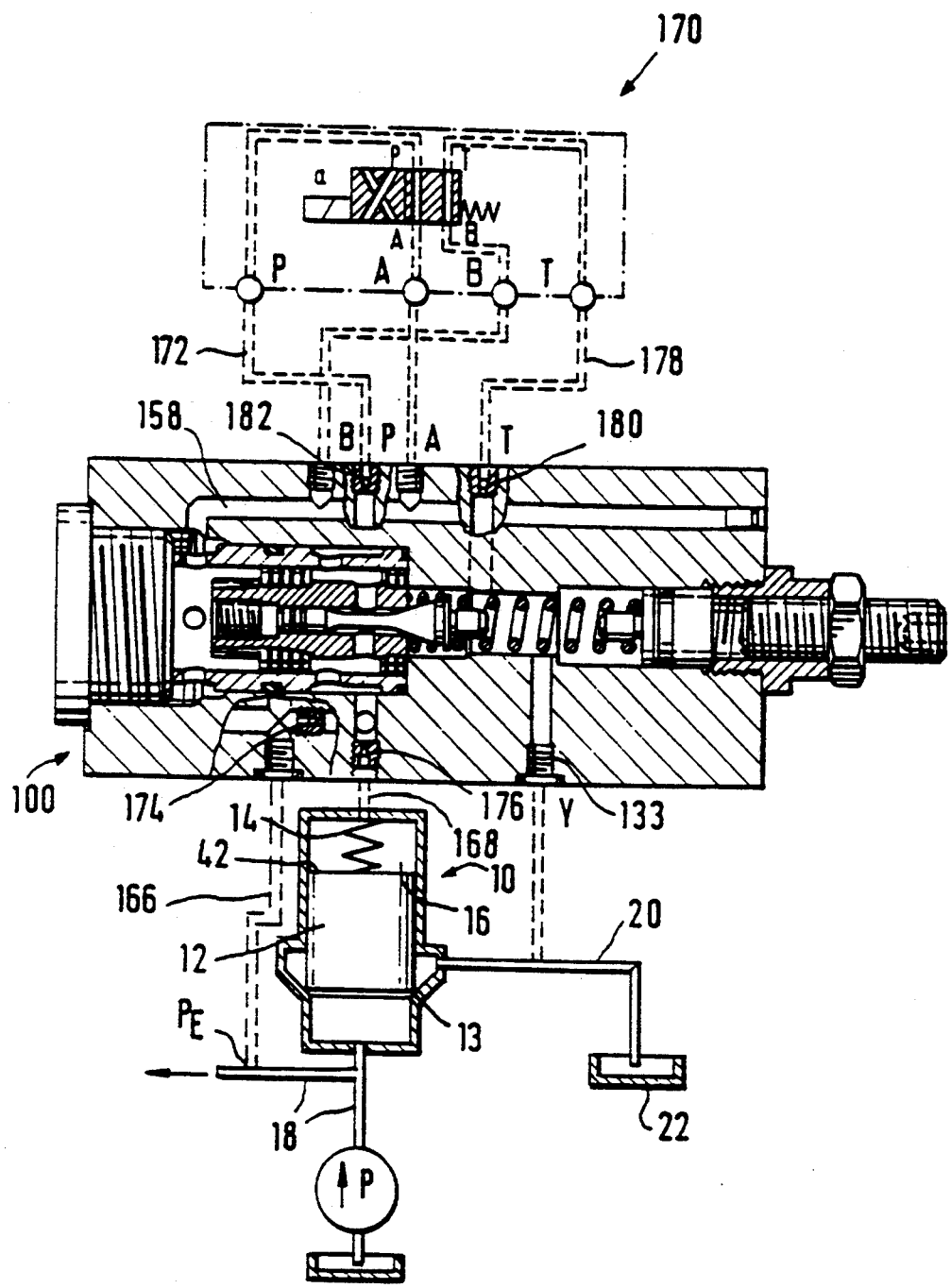
FIG. 5 is a cross sectional view of an embodiment of the pilot stage according to the invention as shown in FIGS. 3 and 4 in a pressure control valve having a manual adjustment means for setting the opening pressure and a device responsive to a control signal to change from a pressure control mode to a pressureless circulation mode.
Figure 6:
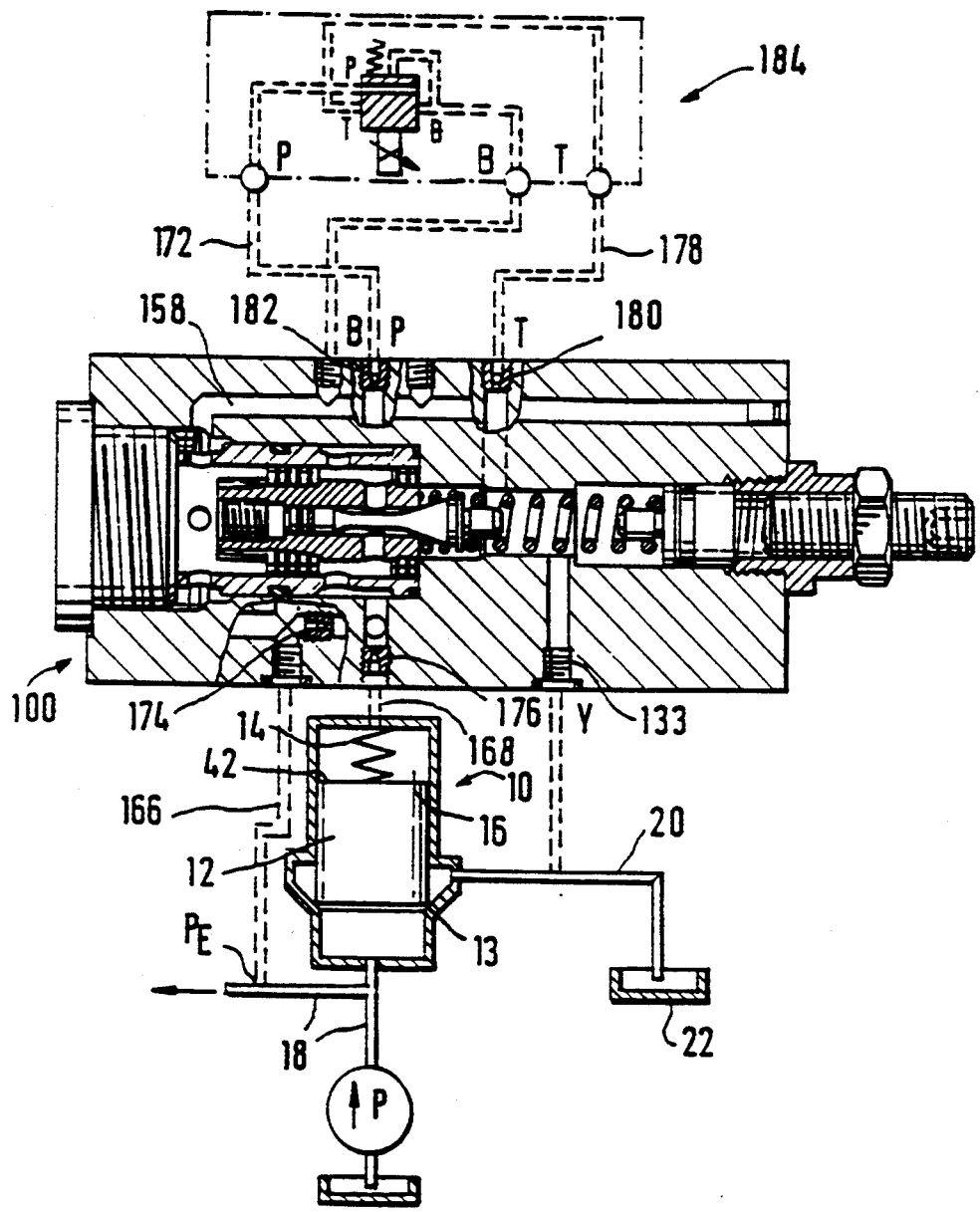
FIG. 6 is a cross sectional view of another embodiment of the pilot stage according to the invention as shown in FIGS. 3 and 4 in a pressure control valve having a proportional pressure control valve including an integrated safeguard against maximum pressure being exceeded.
Figure 7:
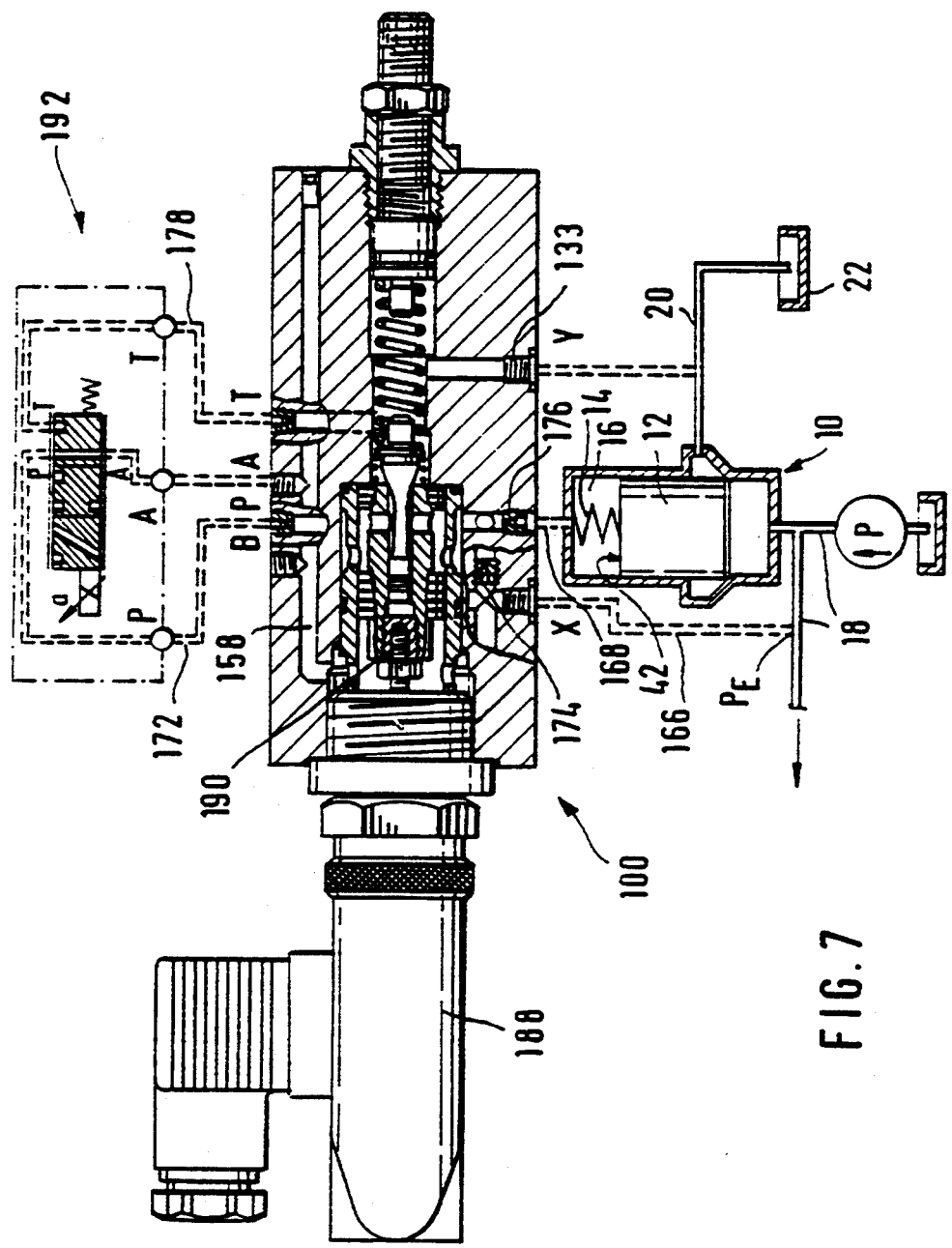
FIG. 7 is a cross sectional view of a further embodiment of the pilot stage according to the invention as shown in FIG. 3 and 4 in a pressure control valve having a proportional pressure control valve including an integrated safeguard against maximum pressure being exceeded and a closed loop position-control circuit.

The mode of operation and essential advantages of the pilot valve 100 shown in FIGS. 3 and 4 are described with reference to FIGS. 5, 6 and 7, showing three different valve embodiments. The pilot stage according to the invention may be an independent valve, e.g. a plate-valve, mounted on the housing of the main stage or may be integrated directly into a common housing with the main stage.

In the valve embodiments of FIGS. 5, 6 and 7, the pilot valve 100 according to the invention is used in each case with a pressure control valve 10 as the main stage. For the purpose of describing the main stage, reference is made to FIGS. 1 and 2. Identical elements have been provided with the same reference numbers. Note that the reference numbers that relate to parts of the pilot valve 100 are shown in FIGS. 3 and 4. For clarity, these reference numbers have been omitted from FIGS. 5, 6 and 7. FIGS. 3 and 4 should accordingly also be consulted for better understanding of the following description.

In FIG. 5, the pilot valve 100 and the pressure control valve 10 together form a pilot-controlled pressure control valve in which the opening pressure is adjusted manually. The closing force acting on the closure cone 104 is accordingly set by pre-loading the pressure-setting spring 106 using the adjusting means 108. The first control channel 133 of the pilot valve 100 is connected to the tank 22. The second control channel 156 of the pilot valve 100 is connected through a pilot oil pressure port 166 to the hydraulic system 18, such that the closure cone 104 is pressurized in its valve seat 140 with the system pressure $P_E$. By way of a main control chamber port 168, the second control channel 156 is likewise connected to the main control chamber 16. Provided that the system pressure $P_E$ is lower than the opening pressure set at the adjusting means 108, the main control chamber 16 is pressurized through the pilot oil pressure port 166 and the main control chamber port 168 with the system pressure $P_E$. If the areas of the main control surface 42 and the cross section of the main valve seat 13 are equal, the main piston 12 is in hydrostatic equilibrium and is pressed by the piston-spring 14 onto the main valve seat 13 to form a seal.

The reference number 170 indicates a 4/2-way valve (represented by its graphic symbol according to ISO 1219), which is actuated electromagnetically and has four ports (A, B, P and T), two control positions, and a basic position defined by spring force. In one of the two control positions of the directional valve 170, the pressure chamber 164 of the pilot valve 100 is connected through the directional valve 170 and a control pressure channel 172 through the valve housing 102 to the pilot oil pressure port 166 (only part of the control pressure channel 172 is illustrated in the valve housing 102). In this control position the valve piston 110 of the pilot valve 100 is accordingly pressed with great force against the shoulder surface 130.

If the system pressure $P_E$ in the hydraulic system 18 exceeds the set opening pressure, the closure cone 104 lifts away from the valve seat 140. A flow of pilot oil from the main control chamber 16, limited by an inlet throttle 174 in the pilot oil pressure port 166, flows through the valve seat 140 and the first control channel 133 to the tank 22. In the connection channel 142, which communicates with the valve seat 140, the control pressure is accordingly largely constant. This control pressure $P_c$ acts through the main control chamber port 168 on the main control surface 42 of the main control piston 12. If the system pressure continues to rise, then the hydrostatic force acting on the main piston in the opening direction ultimately becomes greater than the spring force of the main piston spring 14 acting in the closing direction. The main piston 12 then lifts away from its valve seat 13 and the flow is deviated through the relief channel 20 to the tank 22. Pressure control has thus taken effect.

A damping throttle 176 in the main control chamber port 168 damps the movements of the main piston 12. The pressure difference between the system pressure and the control pressure, the main piston spring 14, and the flow cross section of the inlet throttle 174 determines the flow of pilot oil through the pilot valve 100. The operational behavior may be further stabilized by optimally matching the inlet throttle 174 and the damping throttle 176 so as to minimize pressure fluctuations so that a characteristic curve (Q;$P_E$) is developed having little rise in the system pressure $P_E$ as the flow through the pressure control valve 10 increases.

The 4/2-way valve 170 is connected to the third control channel 158 by way of using either of its two working ports (A and B). If depressurization is to be effected when the directional valve 170 is without current as shown in FIG. 5, the connection with the working port A is closed by a stopper. However, if depressurization is to be effected with the directional valve 170 actuated (not shown), the connection with the working port B is closed by a stopper. In both cases, when switching to depressurization of the hydraulic system 18, the pressure chamber 164 of the pilot valve 100 is depressurized by the directional valve 170 through a control tank channel 178 to the tank 22. For example, the tank channel 178 may open into the valve chamber 132 of the pilot valve 100 (as shown in FIG. 5), which is Connected through the first control channel 133 to the tank 22. Of course, a 3/2-way valve may be used in place of the illustrated 4/2-way valve.

A force F acts on the valve piston 110 in the direction of the closure stopper 114. The modulus of this force is:

$$F = P_C A_s \quad (1)$$

where $P_C$ is the opening pressure pre-set by the pressure-setting spring 106 (or rather the control pressure that becomes established) and $A_s$ is the free cross section of the valve seat 140. This force is available, on switching to depressurization, to displace the valve piston 110 in the direction of the closure stopper 114. The pilot oil from the pressure chamber 164 is then pressed through the third control channel 158, the directional valve 170 and the control tank channel 178 into the tank 22. Here the movement of the valve piston 110 is very slow, since the available force F creates a pressure in the pressure chamber 164 that is smaller than the pressure $P_C$ by the factor $$k = \frac{A_S}{A_D} \quad (k < 1) \quad (2)$$

where $A_D$ is the cross sectional area of the guide bore 124 in the valve sleeve 112. The speed of movement of the valve piston 110 may be made even slower by installing a discharge throttle 180 in the control tank channel 178.

The pressure-setting spring 106 relaxes proportionally to the distance that the valve piston 110 moves in the direction of the closure stopper 114. The set opening pressure, and thus the control pressure in the main control chamber 16 of the pressure control valve 10, therefore decreases relative to the movement of the valve piston 110. The pressure control valve 10 opens to the relief channel 20, but always remains under the control of the pilot valve 100.

The opening spring 141 in the pilot valve 100 guarantees that once the closure cone 104 lifts away from the valve seat 140, the discharge of pilot oil from the control chamber 16 to the tank 22 will proceed to completion in spite of forces produced by the flow of the fluid through the valve, which act in the closing direction on the closure cone 104.

The progress of depressurization may be intentionally influenced, i.e. slowed down, by the pilot control valve 100 according to the invention. In the embodiment shown in FIG. 5, the reduction factor, k, is about 1:15. That means that the pressure available in the pressure chamber 164 is fifteen times smaller than the control pressure $P_C$. It is therefore possible to adjust, using throttle diameters larger than 0.6 to 1 mm, the slow depressurization times so that no depressurization shock occurs. Depressurization is achieved by time-controlled relaxation of the pressure-setting spring 106 (by time-controlled reduction of the pre-set desired pressure value) without having to intervene in the pressure-regulating function of the main piston 12 of the main stage.

This is not the case with the prior art valves of FIG. 1. During depressurization of the main control chamber 16, which is under high pressure, the pilot valve 24 is bypassed by way of the directional valve 46, as described above. Due to the high pressure difference at the throttle 50 in the control tank channel, the opening movement of the main piston 12 is slowed only to a very limited extent.

It is also possible to influence the pressure build-up phase of pilot valve 100 using an inlet throttle 182 incorporated in the pressure channel 172. The free cross section of the throttle 182 determines the rate of movement of the valve piston 110 in the direction of its first axial end position and thus the pressure build-up time. Depressurization and pressure build-up phase may therefore be influenced independently of one another using discharge throttle 180 and inlet throttle 182.

In FIG. 6 another embodiment is illustrated where the 4/2-way valve 170 of FIG. 5 is replaced with a proportional pressure-regulating valve 184 having three ports (B, P and T) and a proportional actuating coil. A basic position of the valve is defined by spring force. The B-port is connected to the third control channel 158; the P-port is connected to the control pressure channel 172; and the T-port is connected to the control tank channel 178. The pressure in the B-port is controlled proportionally to a control current in a low-pressure range (i.e. 0 to 12 bars). The pressure chamber 164 in the pilot valve 100 is pressurized with this proportionally controlled low pressure. An area ratio of about 15:1 between the guide bore 124 and the free cross section of valve seat 140, guarantees that the pre-controlled low pressure in the pressure chamber 164 is sufficient to pre-load the pressure-setting spring 106 by displacement of the valve piston 110. Accordingly, a control pressure is controlled by the pressure-setting spring 106 proportionally to control current, and the system pressure $P_E$ in the hydraulic system 18 is controlled proportionally to this control pressure as described above.

The maximum system pressure may be set manually by adjusting means 108. This setting is independent of the control electronics of the pressure-regulating valve 184. The control pressure cannot exceed the maximum pressure set manually at the adjusting means 108 if an error occurs in these control electronics. Indeed, the valve piston 110 may advance only as far as the end stop against the annular shoulder surface 130, even with excessive actuating pressure in pressure chamber 164. Therefore an additional, manually-adjustable, pilot valve, as is shown in FIG. 2, is superfluous since this function is already a basic function of the pilot valve 100 according to the invention.

Figure 2:
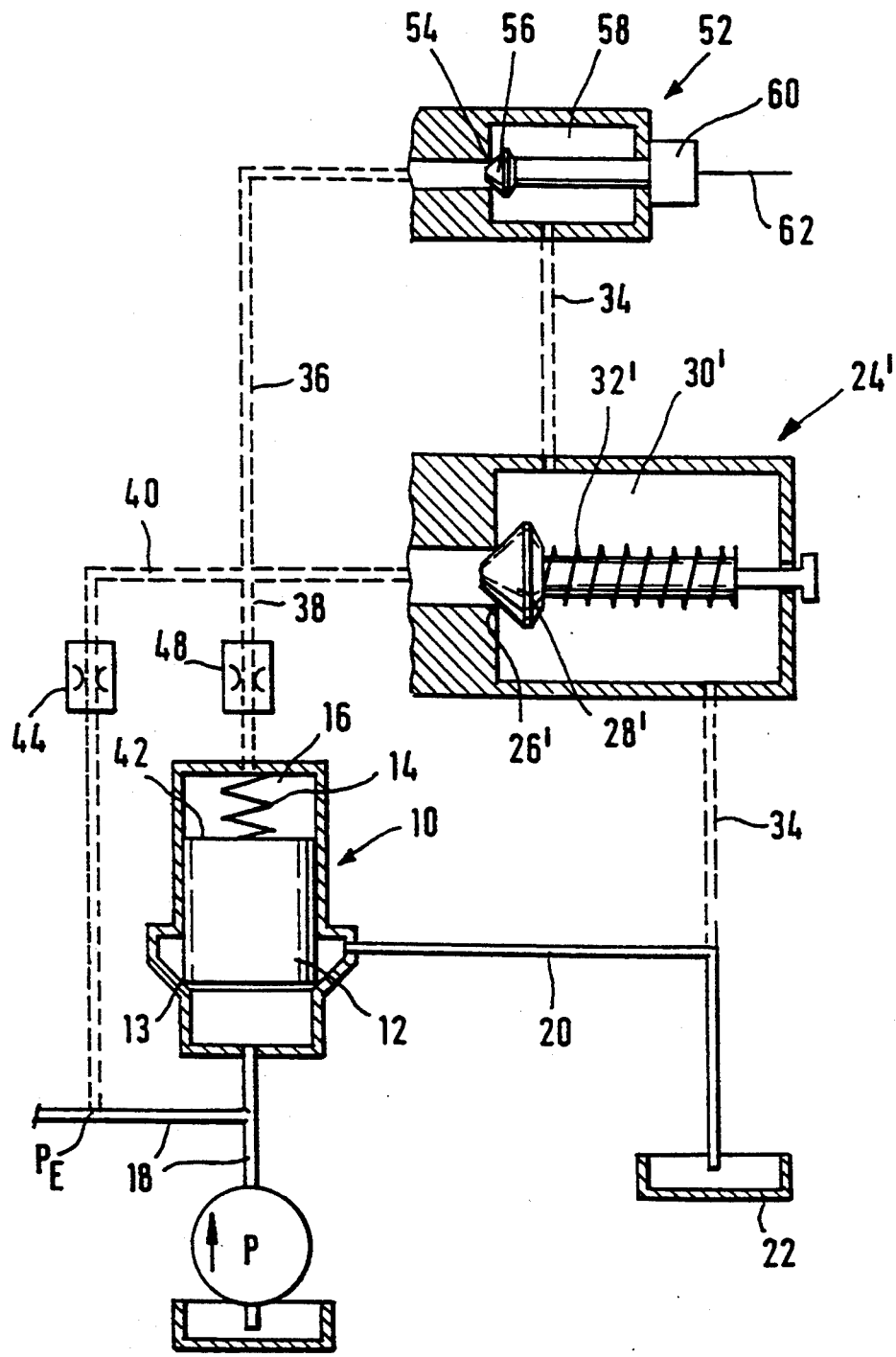
FIG. 2 is a hydraulic layout of a prior art, pilot-controlled, pressure control valve including a proportional, pressure control valve having an additional safeguard against the maximum pressure being exceeded.

As compared to the prior art valve arrangement shown in FIG. 2 the pilot valve 100 according to the invention makes it possible to achieve an improved valve characteristic (Q; $P_E$) having a substantially flatter rise of the system pressure $P_E$ as the valve flow-through Q increases. This advantage may be attributed to the approximately 10-times larger free cross section of the valve seat 140 of the pilot valve 100 compared with prior art pilot valves having proportional actuating coils.

FIG. 7 shows a further embodiment of the pilot valve 100 in a pilot-controlled, proportional pressure control valve. The closure stopper 114 of the pilot valve 100 is replaced by a displacement sensor 188 which detects the exact position of the valve piston 110 and generates an output signal proportional to this position. For example, the displacement sensor may be a pressure-tight inductive displacement sensor that is mechanically connected by way of a screw stopper 190 to the valve piston 110.

A proportional displacement valve 192 with a proportional actuating coil is connected by an A-port to the second control channel 156, by a T-port to the control tank channel 178, and by a P-port to the control channel 172 of the pilot valve 100. The position of valve piston 110 is then controlled in a closed loop, position-controlling circuit. For that purpose, the output signal of displacement sensor 188 is compared with a desired value and the proportional pressure-regulating valve 192 is correspondingly adjusted. The pre-loading of the pressure-setting spring 106 is consequently continuously variable with high precision in accordance with the pre-set desired value and, as described above, regulates the corresponding system pressure $P_E$ in the hydraulic system 18. The pilot valve 100 is a simple means to build an electrically-controlled, proportional pressure-control valve of high adjustment accuracy.

What is claimed is:

1. A pilot stage for a pressure control valve comprising:
   a housing having therein a valve piston guide bore, a valve chamber, a pressure chamber, and first, second, and third control channels, said valve piston guide bore having a piston stop, said valve chamber being fluidically coupled to said first control channel, and said pressure chamber being fluidically coupled to said third control channel;
   a valve piston slidably mounted in said valve piston guide bore for axial movement therein through a range of motion bounded at one end by a first axial end position in which said valve piston is engaged with said piston stop, said valve piston axially bounding said valve chamber at one end thereof, and said valve piston having: a valve seat formed therein having a free cross section; a connection channel therethrough fludically coupling said second control channel with said valve seat; and an actuating surface disposed in said pressure chamber and having a cross-sectional area substantially larger than said free cross section of said valve seat;
   a closure element disposed in said valve chamber for axial displacement therein and being operably engageable with said valve seat;
   a pressure-setting spring coupled to said closure element to bias said closure element with a closing force into engagement with said valve seat and thereby urging said valve piston away from said first axial position;
   whereby pressurization of said pressure chamber produces a hydrostatic force on said valve piston opposing said closing force of said pressure-setting spring and urging said piston toward said first axial end position.

2. The pilot stage of claim 1, wherein:
   said valve piston includes a damping piston guide bore therein; and
   said closure element includes:
      a damping piston disposed in said damping piston guide bore for axial movement therein; and
      a closure cone fixed to said damping piston.

3. The pilot stage of claim 1:
   wherein said valve piston further includes first and second axially-spaced cross sectional regions sealingly fitted in said valve piston guide bore and defining therebetween in said valve piston guide bore an inner annular chamber, said connection channel being fluidically coupled with said inner annular chamber; and
   further comprising means for connecting said inner annular chamber to said second control channel.

4. The pilot stage of claim 3, further comprising
   a valve sleeve fitted in said housing and having said guide bore formed therein;
   an outer annular chamber surrounding said valve sleeve and being fluidically coupled to said second control channel; and
   a connecting opening through said valve sleeve fluidically coupling said inner annular chamber to said outer annular chamber.

5. A pilot controlled, manually adjustable pressure control valve for selectively relieving a pressurized hydraulic system to an unpressurized tank, the tank having a relief channel coupled thereto, said control valve comprising:
   a main stage having:
      a control chamber;
      a first main flow port fludically coupled to the hydraulic system; and
      a said second main flow port fluidically coupled to the relief channel;
   a pilot valve having:
      a housing having therein a valve piston guide bore, a valve chamber, a pressure chamber, and first, second, and third control channels, said valve piston guide bore having a piston stop, said valve chamber being fluidically coupled to said first control channel, and said pressure chamber being fluidically coupled to said third control channel, said first control channel being fluidically coupled to the tank and said second control channel being fluidically coupled to the hydraulic system and to said main stage control chamber;
      a valve piston slidably mounted in said valve piston guide bore for axial movement therein through a range of motion bounded at one end by a first axial end position in which said valve piston is engaged with said piston stop, said valve piston axially bounding said valve chamber at one end thereof, said valve piston having: a valve seat formed therein with a free cross section; a connection channel therethrough fludically coupling said second control channel with said valve seat; and an actuating surface disposed in said pressure chamber and having a cross-sectional area substantially larger than said free cross section of said valve seat;
      a closure element disposed in said valve chamber for axial displacement therein and being operably engageable with said valve seat;
      a pressure-setting spring coupled to said closure element to bias said closure element with a closing force into engagement with said valve seat and thereby urging said valve piston away from said first axial position; and
      means for manually adjusting said pressure-setting spring; whereby pressurization of said pressure chamber produces a hydrostatic force on said valve piston opposing said closing force of said pressure-setting spring and urging said piston toward said first axial end position; and
   a directional valve fluidically coupled via said third control channel with said pressure chamber, said directional valve having first and second operative positions and including:
      a control pressure channel fluidically coupling said pilot valve pressure chamber to the hydraulic system in said first position; and
      a control tank channel fluidically coupling said pressure chamber to the tank in said second position.

6. The valve of claim 5, further comprising a discharge throttle disposed in said control tank channel.

7. The valve of claim 5, further comprising an inlet throttle disposed in said control pressure channel.

8. A pilot-controlled proportional pressure control valve for selectively relieving a pressurized hydraulic system to an unpressurized tank, the tank having a relief channel coupled thereto, said control valve comprising:
- a main stage having:
  - a control chamber;
  - a first main flow port fludically coupled to the hydraulic system; and
  - a said second main flow port fluidically coupled to the relief channel;
- a pilot valve having:
  - a housing having therein a valve piston guide bore, a valve chamber, a pressure chamber, and first, second, and third control channels, said valve piston guide bore having a piston stop, said valve chamber being fluidically coupled to said first control channel, and said pressure chamber being fluidically coupled to said third control channel, said first control channel being fluidically coupled to the tank and said second control channel being fluidically coupled to the hydraulic system and to said main stage control chamber;
  - a valve piston slidably mounted in said guide bore for axial movement therein through a range of motion bounded at one end by a first axial end position in which said valve piston is engaged with said piston stop, said valve piston axially bounding said valve chamber at one end thereof, said valve piston having:
    - a valve seat formed therein with a free cross section;
    - a connection channel therethrough fludically coupling said second control channel with said valve seat; and
    - an actuating surface disposed in said pressure chamber and having a cross-sectional area substantially larger than said free cross section of said valve seat;
  - a closure element disposed in said valve chamber for axial displacement therein and being operably engageable with said valve seat;
  - a pressure-setting spring coupled to said closure element to bias said closure element with a closing force into engagement with said valve seat and thereby urging said valve piston away from said first axial position; and
  - whereby pressurization of said pressure chamber produces a hydrostatic force on said valve piston opposing said closing force of said pressure-setting spring and urging said piston toward said first axial end position; and
- a proportional pressure-regulating valve responsive to a control input signal, comprising:
  - a P-port and a T-port;
  - a control pressure channel connecting said P-port to the hydraulic system;
  - a control tank channel connecting said T-port to the tank;
  - a B-port connected to said third control channel of said pilot stage,
- said proportional pressure-regulating valve pressurizing said pressure chamber of said pilot valve through said third control channel proportionally to the control input signal.

9. The valve of claim 8, further comprising:
- a displacement sensor disposed to sense the position of said valve piston, and
- means for controlling the position of said valve piston proportionally to a pre-set desired value signal, thereby controlling the pre-loading of said pressure-setting spring in a closed-loop.

* * * * *